April 15, 1924.
A. G. GUSTAFSON
WIRE WHEEL
Original Filed Dec. 8, 1919   2 Sheets-Sheet 1
1,490,531
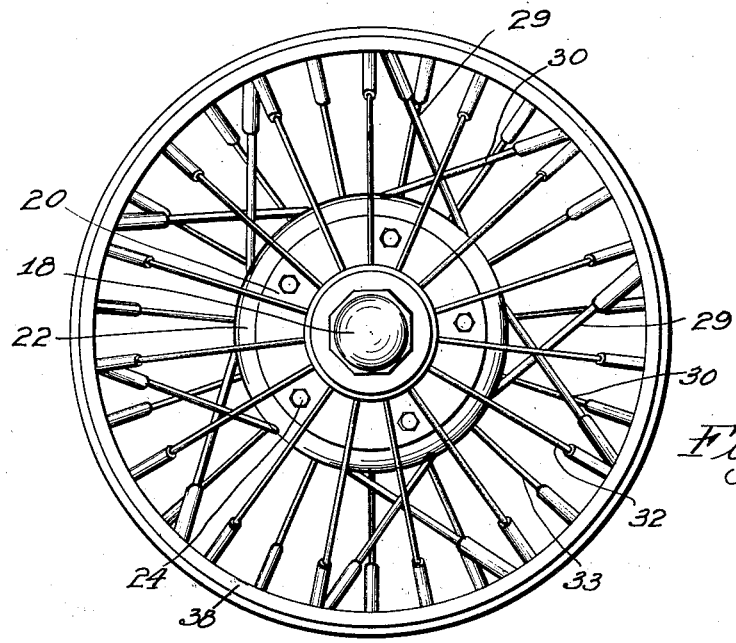
Fig 1
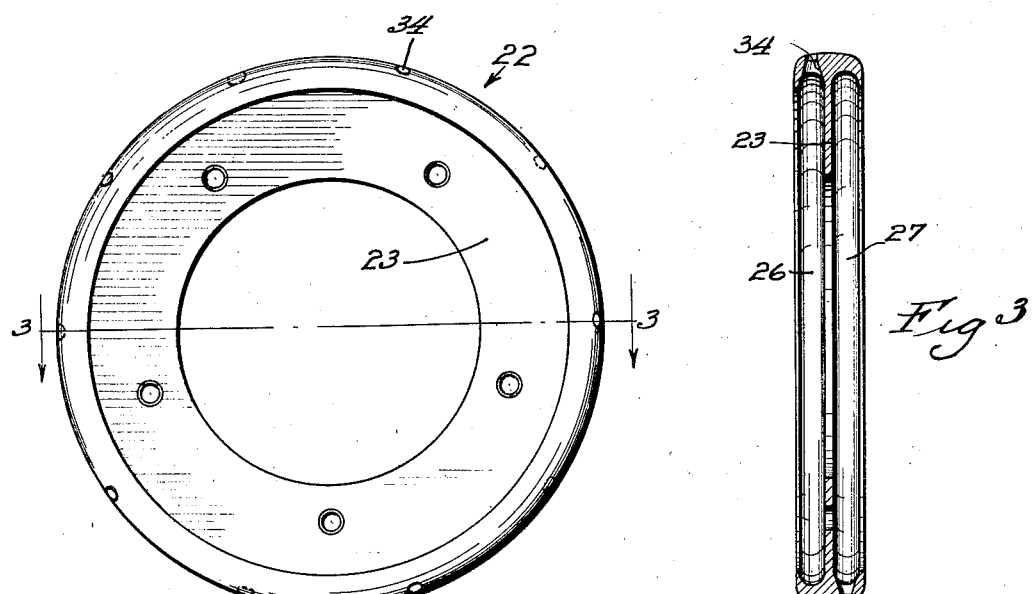
Fig 2
Fig 3
INVENTOR.
ANDREW. G. GUSTAFSON.
ATTORNEYS.

April 15, 1924. 1,490,531
A. G. GUSTAFSON
WIRE WHEEL
Original Filed Dec. 8, 1919 2 Sheets-Sheet 2
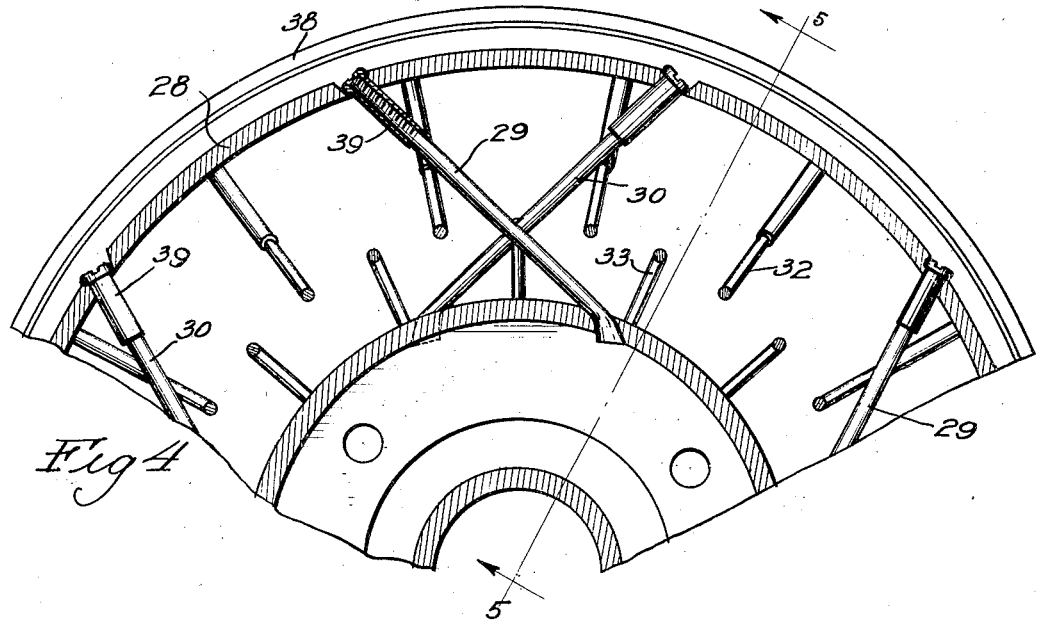
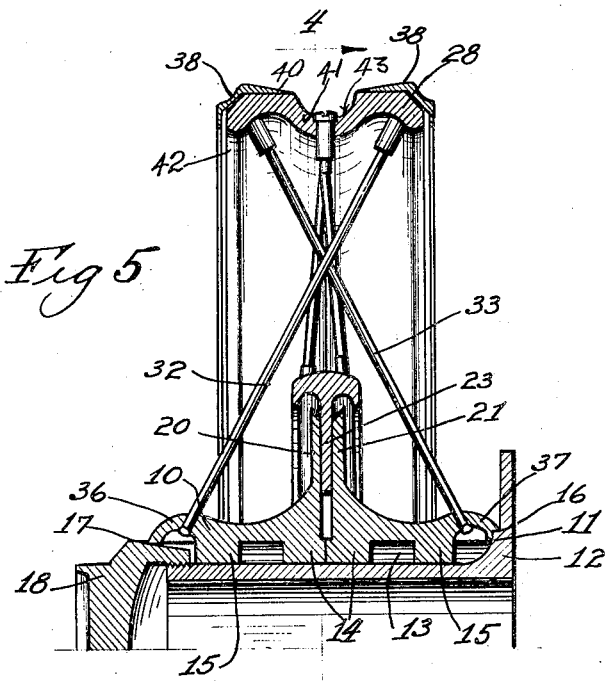
INVENTOR.
ANDREW G. GUSTAFSON.
ATTORNEYS.

Patented Apr. 15, 1924.

1,490,531

UNITED STATES PATENT OFFICE.

ANDREW G. GUSTAFSON, OF AURORA, ILLINOIS.

WIRE WHEEL.

Application filed December 8, 1919, Serial No. 343,165. Renewed November 29, 1922.

*To all whom it may concern:*

Be it known that I, ANDREW G. GUSTAFSON, a citizen of the United States, residing at Aurora, in the county of Kane and State of Illinois, have invented certain new and useful Improvements in Wire Wheels, of which the following is a specification.

My invention relates to vehicle wheels and more specifically to the type in which the rim is supported entirely by tension spokes, preferably wires or small rods.

One object of my invention is to arrange a plurality of these spokes so that all the loads imposed upon the wheel may be carried by stresses in spokes extending approximately in the direction of the line of force of the load itself, thereby securing a maximum of rigidity and strength with a minimum of material.

Another object is to provide an arrangement in which the annular parts employed are relatively simple and cheap forms, easy to assemble and durable in service.

An additional object is to provide an arrangement whereby the assembling of the annular parts and the spokes to form the complete wheel may be rendered simple and inexpensive and whereby also the replacement of individual damaged spokes may be readily accomplished. Devices according to my invention are adapted for use in connection with any type of rim, which may be designed to receive the tire directly or to support a demountable rim on which the tire is fastened.

Another object of my invention is to provide an arrangement in which all the spokes necessary for the complete support of the rim may be placed in the most advantageous positions and at the same time no spoke will touch any other spoke. This arrangement avoids rubbing, vibration and crystallization which is apt to occur where two spokes press against each other.

Further objects and advantages of my invention will become apparent as the description proceeds.

This application is a continuation in part of my copending application Serial No. 197,791, filed October 22, 1917.

Referring to the accompanying drawings, Figure 1 is a side view of an illustrative embodiment of my invention. Fig. 2 is a side view of the ring carrying the torque spokes. Fig. 3 is a section on the line 3—3 of Fig. 2. Fig. 4 is a section on the line 4—4 of Fig. 5 and Fig. 5 is a section on the line 5—5 of Fig. 4.

The structural embodiment I have selected for illustrating my invention comprises a pair of annular members 10 and 11 adapted to fit on the hub 12 in sliding engagement therewith. For the sake of lightness an annular channel 13 may be cut in each member defining inwardly projecting ribs 14 and 15 on either side of it adapted to engage the hub 12. The inner annular member engages a shoulder 16 on the hub 12 and the outer annular member engages a shoulder 17 on a cap 18 having screw-threaded engagement with the outer end of the hub 12 and adapted to force the annular members 10 and 11 against each other and the shoulder 16 respectively whereby they are rigidly clamped to and supported upon the hub 12.

When large torques are to be transmitted and the drive is through the hub 12 the annular members 10 and 11 may obviously be keyed to the hub by one or more axially extending keys in the customary manner. The hub 12 may be supported on the end of a vehicle axle by suitable bearings of any desired type which are not illustrated as they form no part of my present invention.

As clearly illustrated in Fig. 5, members 10 and 11 carry outwardly projecting flanges 20 and 21 located in a plane perpendicular to the axis of rotation of the wheel and approximately centrally with respect to the entire structure. The annular member 22 which, for purposes of identification, I shall call a torque ring, is provided, comprising inwardly extending flange 23 adapted to enter between the flanges 20 and 21 and suitably bolted thereto by any desired number of bolts 24, and a main outer portion extending in opposite directions from the plane of the flange 23 and shaped to form two inwardly opening annular channels 26 and 27.

The rim 28 is supported by two sets of spokes, torque spokes 29 and 30 extending from the outer periphery of the torque ring 22 tangential to a circle only a trifle smaller than said torque ring, in the central transverse plane of the wheel, and attached to the center of the rim 28 by screw caps 39 countersunk in said rim. A plurality of axial load spokes are provided comprising inwardly directed spokes 32 and outwardly directed spokes 33 engaging the outer and inner annular members 10 and 11 respectively at points widely spaced axially from the central transverse plane of the wheel and crossing said central transverse plane for attachment to the rim 28 at points also spaced axially from the central transverse plane.

The torque spokes 29 and 30 may have their inner ends entered in tapered holes 34 in the periphery of the torque rim 22, the ends being suitably upset or riveted for attachment and the axial load spokes may be similarly attached to the flanges 36 and 37 of the annular members 10 and 11.

Upon reference to Fig. 5 it will be seen that the outer ends of the torque spokes 29 and 30 all lie in the same plane but that the inner ends are alternately spaced a trifle from said plane in opposite directions so as to enter the holes 34. This spacing is sufficient to space the spokes 29 and 30, where they appear to cross each other in Fig. 4, an appreciable distance apart so that they do not touch each other. The axial load spokes 32 and 33 are also arranged, as clearly indicated in Fig. 4, so that no two spokes lie in the same radial plane. They are also spaced so that none of them touch any of the torque spokes 29 or 30.

The rim 28 may be of the shape illustrated or of any other preferred shape adapted to support either the tire itself or a demountable rim upon which the tire is fastened. Annular members 38 may, under certain circumstances, be employed to cover the heads of the screw caps 39 of the axial load spokes and form part of or a suitable support for a tire holding device of any desired type.

The rim 28 illustrated has an irregular cross section as shown in Fig. 5 having two approximately flat portions 40 separated by a U-shaped bight 41. The rib formed by this U-shaped bight and the ribs 42 formed at the edges materially reinforce and strengthen the entire rim. The annular groove 43 formed on the outside by the rib is also particularly advantageous in that the torque spokes 29 and 30 may, if desired, be fastened in place with relatively cheap screw caps having enlarged heads, without countersinking the holes. The projecting heads will obviously be housed in the groove out of the way of the tire or tire-carrying device mounted on the rim.

The loads imposed upon a vehicle wheel of this type are of three kinds: first, the dead load of the vehicle itself tends to move the hub radially downward out of the center of the wheel; second, when the wheel is used for driving purposes or brakes are applied to it for stopping the vehicle, the hub 12 is exposed to a torque tending to rotate it with respect to the rim; and thirdly, in riding over slanting ground or turning corners the portion of the rim engaging the ground will be subjected to a strong axial thrust acting parallel to the axis of rotation of the wheel.

Considering these loads in the inverse order as enumerated above, the axial load upon the improved wheel I have illustrated will be carried entirely by the axial load spokes 32 and 33, as the case may be. This will be apparent from the following consideration. Referring to Fig. 5, a displacement of the rim axially with respect to the hub will be accompanied by a practically negligible elongation of the torque spokes 29 and 30 as these extend in a direction at right angles to the displacement and are of considerable length, so that displacement of the rim axially through say 0.002 of the length of the spoke would only elongate the spoke 0.000004 of its length, which in ordinary metal having a Young's modulus of 30,000,000 would only produce a stress of 120 lbs. per square inch, whereas the same displacement, due to the angle at which the axial load spokes extend would, assuming that they make an angle of 30° with the central tranverse plane, elongate them by 0.001 of their length, producing a stress of 30,000 lbs. per square inch.

The torque loads will similarly be carried entirely by the torque spokes 29 and 30 as a slight rotation of the hub with respect to the rim would tend to move the ends of the axial load spokes in a direction at right angles to their length, whereas it would necessarily move the ends of the torque spokes almost parallel to the direction in which said spokes extend. The torque ring 22 provides attachment means for the torque spokes at points axially more remote than the attachment points for the axial load spokes. This makes it possible to set the torque spokes at the most efficient angle and economize in the use of material.

The dead loads imposed upon such a wheel are in many instances smaller and always easier to compute and allow for than the live loads above referred to. It will be noted that in any position of the wheel there are a considerable number of axial load spokes making an angle of approximately 60° with the direction of displacement produced by the dead load, and there are also a substantial number of torque spokes extending at various angles, some of them almost parallel to the direction of such displacement.

By slipping the wheel off the hub a damaged spoke may be readily removed by sliding it in past the axis of the wheel. The screw cap is first unscrewed, after which the spoke may be drawn out, or, if it is badly bent it may be moved far enough to expose the enlarged head, which may be cut off with a pair of wire cutters or a cold chisel, to allow removal outwardly.

While I have illustrated and described in detail a preferred embodiment of my invention, it should be clearly understood that the disclosure is merely for purposes of illustration and especially that the relative sizes and proportions of parts, including the angles at which both the torque and the axial load spokes extend, may be varied over a relatively wide range without departing from the spirit of my invention, and that many modifications and variations will naturally occur to those skilled in the art. I aim in the subjoined claims to cover all such legitimate variations and modifications.

I claim as my invention:

1. In a device of the class described, a hub, annular members clamped upon said hub and having peripherally extending flanges located adjacent the central plane of the wheel, an annular member clamped between said peripherally extending flanges providing attachment points spaced around a circle of relatively large diameter, torque spokes extending in a plane transverse to the axis of the wheel approximately at right angles to radii drawn through their inner points of attachment, axial load spokes lying in radial planes, certain of said spokes extending from the outer end of the axle diagonally across the central transverse plane of the wheel for attachment to the edge of the rim farthest removed from the outer end of the axle, and certain other of said axial load spokes extending from the inner end of the axle diagonally outwardly for similar attachment to the opposite edge of the rim.

2. In a device of the class described, a rim, means for supporting said rim comprising a plurality of torque spokes lying in a plane transverse to the axis of the wheel and extending from the rim inwardly in directions tangent to a circle of relatively large diameter, and a plurality of axial load spokes lying in radial planes and extending diagonally from points of attachment to the edges of the rim to other points at the ends of the hub, certain of said axial load spokes being included in one direction along the axis of the wheel and the remainder being inclined in the opposite direction.

3. In a device of the class described, a rim, a hub, a plurality of torque spokes extending from the rim to the hub approximately parallel to the forces generated by applying torque to said hub, a plurality of axial load spokes extending from the edges of said rim to the ends of said hub and crossing each other to make relatively large angles with a plane perpendicular to the axis of the wheel, and attachment means for said torque spokes and said axial-load spokes in the nature of annular flanges projecting outwardly in opposite directions away from the central transverse plane of the wheel.

4. In a device of the class described, a rim, a plurality of spokes adapted primarily to transmit torque and relatively unaffected by axial displacement of said rim, a plurality of axial load spokes adapted to take the axial load imposed on said rim and relatively unaffected by angular displacement of said rim around the axis of said wheel, and a plurality of annular flanges on each side of the central transverse plane of said wheel, said flanges being apertured for the attachment of the inner ends of said torque and axial load spokes thereto.

5. In a device of the class described, a rim supported by a plurality of tension spokes, certain of said spokes lying in radial planes and making relatively large angles with a plane perpendicular to the axis of the rim, and certain other of said spokes lying in a plane perpendicular to the axis of the wheel and making relatively large angles with radii intersecting them.

6. In a device of the class described, a rim, a hub structure having two end portions 10 and 11 and an enlarged central portion 22 and a plurality of tension spokes some of which are attached to said enlarged central portion and others to said end portions for supporting said rim.

7. In a device of the class described, a rim, a hub having end portions and an enlarged central portion, torque spokes extending from said enlarged central portion outwardly near to the center of the rim and spokes extending from each end of said hub diagonally outwardly to the opposite edge of said rim.

8. In a device of the class described, a rim, a hub having end portions and an enlarged central portion, spokes in crossed pairs lying in the plane of the wheel and extending outwardly from said enlarged central portion to the center of said rim, and other spokes lying in radial planes perpendicular to the plane of the wheel and arranged in crossed pairs extending from the ends of said hub diagonally outwardly to the edges of said rim.

9. In a device of the class described, a hub having end portions and an enlarged central portion, there being annular flanges extending outwardly from said end portions and from said enlarged portion on opposite sides of a central plane, said flanges being adapted to receive spokes in fitting engagement.

10. In a device of the class described, a hub, a rim, a plurality of sets of tension spokes completely supporting said rim with respect to said hub, said spokes being arranged so that no spoke touches any other spoke, one set of spokes being tangential to the hub and the other radial.

11. In a device of the class described, a hub, a rim, and a plurality of spokes having their outer ends approximately in a single plane adapted to resist displacement of said hub with respect to said rim in a plane perpendicular to the axis of the wheel only, the inner ends of said spokes being spaced laterally from the plane of the outer ends to provide clearance where said spokes cross each other.

In testimony whereof, I have hereunto set my hand.

ANDREW G. GUSTAFSON.